United States Patent
Ziegler et al.

(10) Patent No.: US 10,470,032 B1
(45) Date of Patent: Nov. 5, 2019

(54) WIRELESS COMMUNICATION SERVICE DELIVERY OVER EXTERNAL WIRELESS COMMUNICATION NETWORKS

(71) Applicant: Sprint Communications Company L.P., Overland Park, KS (US)

(72) Inventors: Bruce Edward Ziegler, Olathe, KS (US); Kimberly Sue Nittler, Overland Park, KS (US); Theodore Eugene Bolerjack, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/265,183

(22) Filed: Feb. 1, 2019

(51) Int. Cl.
- *H04W 4/24* (2018.01)
- *H04W 8/10* (2009.01)
- *H04W 8/20* (2009.01)

(52) U.S. Cl.
CPC .............. *H04W 8/10* (2013.01); *H04W 4/24* (2013.01); *H04W 8/20* (2013.01)

(58) Field of Classification Search
CPC ........... H04W 8/10; H04W 4/24; H04W 8/20
See application file for complete search history.

(56) References Cited

U.S. PATENT DOCUMENTS

| | | | |
|---|---|---|---|
| 6,516,194 B2 | 2/2003 | Hanson | |
| 8,023,942 B2 | 9/2011 | Kumar et al. | |
| 8,359,004 B2 | 1/2013 | Cheng et al. | |
| 9,098,958 B2 | 8/2015 | Joyce et al. | |
| 10,015,648 B2 | 7/2018 | Sym | |
| 2009/0327112 A1 | 12/2009 | Li et al. | |
| 2012/0081557 A1* | 4/2012 | Kupinsky | H04L 12/1407 348/207.1 |
| 2012/0157041 A1 | 6/2012 | Cai et al. | |
| 2013/0090094 A1 | 4/2013 | Shaw | |
| 2015/0223042 A1* | 8/2015 | Li | H04W 4/24 455/406 |
| 2017/0180567 A1* | 6/2017 | Sharma | H04M 15/00 |
| 2017/0180969 A1 | 6/2017 | Chai | |

* cited by examiner

*Primary Examiner* — Chuong A Ngo

(57) ABSTRACT

A wireless communication system serves User Equipment (UE) over external wireless networks. A provisioning system transfers a UE Identity (ID), network ID, and home policy for the UE to a network controller. The provisioning system transfers the network ID and a home rating group to a rating system. The network controller receives the UE ID and network ID from an external network element and transfers the home policy to the external network element. The external network element serves the UE based on the home policy and transfers external usage data to a rating system. The rating system translates the network ID into the home rating group and rates the external usage data using the home rating group. The rating system transfers the UE ID and home-rated usage data to a billing system. The billing system charges for the external network element service using the home-rated usage data.

20 Claims, 10 Drawing Sheets

WIRELESS COMMUNICATION SERVICE DELIVERY OVER EXTERNAL WIRELESS COMMUNICATION NETWORKS

TECHNICAL BACKGROUND

Wireless communication networks serve wireless User Equipment (UE) with mobile data services like voice calling and internet access. The wireless data networks have wireless access points that exchange data signals over the air with the wireless UEs. The wireless access points exchange this data with wireless network cores. The wireless network cores exchange the data with various other systems like the internet. The wireless network cores also process UE identifiers like phone number to control the Quality-of-Service (QoS) for the UEs. Popular forms of wireless networking are Fifth Generation New Radio (5GNR) and Long Term Evolution (LTE).

The wireless network cores generate usage data for the mobile data services. The usage data indicates the amount of data that was transferred in a given time period. A rating system processes the usage data with a rating group. The rating group indicates how to convert the usage data into monetary charges for the amount of usage. The are several different rating groups that may apply to a single UE.

A given wireless communication network serves its own wireless UEs as home devices and this is referred to as home service. When the UEs cannot use their home wireless network, they use other wireless networks and this is referred to as roaming service. Typically, the bills for home service are cheaper than for roaming service. The quality of home service is usually better than for roaming service.

The home wireless communication network and the other wireless networks interact to serve the UEs with the roaming service. Unfortunately, the wireless networks do not efficiently interact to serve the UEs with home services. Moreover, the wireless networks do not effectively provide the UEs with home services across different wireless networking protocols.

Technical Overview

A wireless communication system serves User Equipment (UE) over external wireless networks. A provisioning system transfers a UE Identity (ID), network ID, and home policy for the UE to a network controller. The provisioning system transfers the network ID and a home rating group to a rating system. The network controller receives the UE ID and network ID from an external network element and transfers the home policy to the external network element. The external network element serves the UE based on the home policy and transfers external usage data to a rating system. The rating system translates the network ID into the home rating group and rates the external usage data using the home rating group. The rating system transfers the UE ID and home-rated usage data to a billing system. The billing system charges for the external network element service using the home-rated usage data.

DETAILED DESCRIPTION

Figure 1:
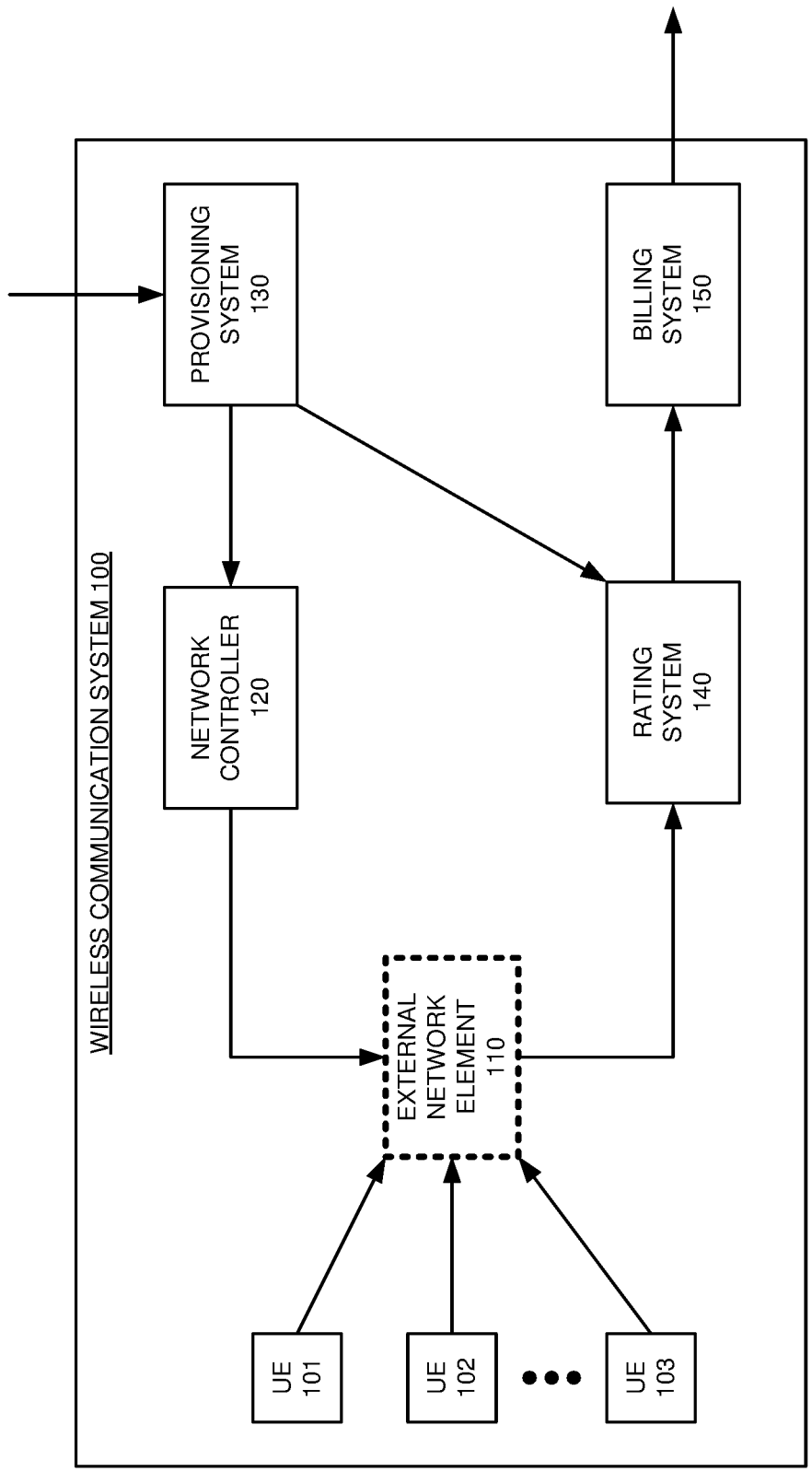
FIG. 1 illustrates a wireless communication system that serves wireless User Equipment (UEs) from an external wireless communication network element.

FIG. 1 illustrates wireless communication system 100 that serves wireless User Equipment (UEs) 101-103 with wireless data services over external network element 110. The wireless data services may include Internet access, voice/video calling, messaging and data transfers, machine-to-machine communications, business transactions, and/or some other over-the-air communication service. Wireless communication system 100 comprises UEs 101-103, external network element 110, network controller 120, provisioning system 130, rating system 140, and billing system 150. The number of UEs, network elements, and controllers that are depicted on FIG. 1 has been restricted for clarity, and wireless communication system 100 may be much larger.

UEs 101-103 could be computers, phones, displays, headsets, or some other user apparatus with wireless communication circuitry. UEs 101-103 exchange user data with external network element 110. At least a portion of the data communications between UEs 101-103 and external network element 110 are wireless. The wireless communications may use Fifth Generation New Radio (5GNR), Institute of Electrical and Electronic Engineers 802.11 (WIFI), Long Term Evolution (LTE), Evolution Data Only (EVDO), Global System for Mobile Communications (GSM), Code Division Multiple Access (CDMA), and/or some other wireless networking protocol. UEs 101-103 each comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems, user applications, and network applications that are stored in the memory circuitry.

External network element 110 could be a Packet Data Network Gateway (P-GW), Fifth Generation Core (5GC) User Plane Function (UPF), Fifth Generation New Radio (5GNR) Node B (gNodeB), Serving Gateway (S-GW), Long Term Evolution (LTE) Evolved Node B (eNodeB), Home Agent (HA), Internet Protocol (IP) router, Mobile Switching Center (MSC), 5GC Session Management Function (SMF), 5GC Access and Mobility Management Function (AMF), LTE Mobility Management Entity (MME), IP Multimedia Subsystem (IMS) call function, Software Defined Network (SDN) data-plane machine, Network Function Virtualization (NFV) Virtual Switch (vSW), Virtual Network Function (VNF), and/or some other networking apparatus.

External network element 110 exchanges user data with UEs 101-103 over data communication links that are at least partially wireless. External network element 110 exchanges network signaling with network controller 120 over data communication links that may be wireline and/or wireless. Wireline protocols include Time Division Multiplexing (TDM), Ethernet, IP, Data Over Cable System Interface Specification (DOCSIS), Wave Division Multiplexing (WDM), and the like. External network element 110 comprises transceiver circuitry and processing circuitry. The transceiver circuitry comprises modulators, digital/analog interfaces, processing units, memory circuitry, firmware/software, and bus circuitry. The processing circuitry comprises processing units, memory circuitry, bus circuitry, and software. In the processing circuitry, the processing units execute operating systems, virtual layers, and network applications that are stored in the memory circuitry.

Network controller 120 could be a Policy Charging Rules Function (PCRF), Service Control Point (SCP), Authentication Authorization and Accounting (AAA), Home Location Register (HLR), 5GC Policy Control Function (PCF), IMS Application Server (AS), 5GC Authentication Server Function (AUSF), Home Subscriber System (HSS), Software Defined Network (SDN) controller, SDN application, NFV VNF, and/or some other communication network elements. Network controller 120 exchanges network signaling with external network element 110 and provisioning system 130 over wireline and/or wireless communication links. Network controller 120 comprises transceiver circuitry and processing circuitry. The transceiver circuitry comprises modulators, digital/analog interfaces, processing circuitry, memory circuitry, firmware/software, and bus circuitry. The processing circuitry comprises processing units, memory circuitry, bus circuitry, and software. In the processing circuitry, the processing units execute operating systems, virtual layers, and network applications that are stored in the memory circuitry.

Provisioning system 130, rating system 140, and billing system 150 comprise a computer or a network of computers. Provisioning system 130 receives user inputs and transfers network signaling to network controller 120 and rating system 140 over wireline and/or wireless communication links. Rating system 140 receives unrated usage data from external network element 110 and transfers rated usage data to billing system 150. Billing system 150 receives the rated usage data and generates bills for the data communication services consumed by UEs 101-103. Systems 130, 140, and 150 comprise transceiver circuitry and processing circuitry. The transceiver circuitry comprises modulators, digital/analog interfaces, processing units, memory circuitry, firmware/software, and bus circuitry. The processing circuitry comprises processing units, memory circuitry, bus circuitry, and software. In the processing circuitry, the processing units execute operating systems, virtual layers, and network applications that are stored in the memory circuitry.

UEs 101-103 each home to a wireless communication network that includes network controller 120, provisioning system 130, and rating system 140. UEs 101-103 do not home to the wireless communication network that includes external wireless network element 110. For example, UEs 101-103 may subscribe to a national wireless internet-access company, and external wireless network element 110 may be operated by a different national wireless internet-access company. UE 101 represents prior UEs and still roams on external network element 110 in the typical manner. UE 102 roams on external network element 110 for some services, but UE 102 is home on external network element 110 for other services. UE 103 is home on external network element 110 for all services.

Responsive to user input, provisioning system 130 transfers a UE Identity (ID), network ID, and home policy for UE 102 to network controller 120. Responsive to user input, provisioning system 130 transfers a different UE ID, network ID, and home policy for UE 103 to network controller 120. The home policies for UEs 102-103 indicate or are otherwise associated with respective home rating groups. In contrast, UE 101 is associated with a roaming rating group. Provisioning system 130 transfers these network IDs and their associated home rating groups to rating system 140. Provisioning system 120 also transfers the UE IDs and network IDs to respective UEs 102-103 through a Preferred Roaming List (PRL), Over-the-Air (OTA) provisioning, Radio Resource Control (RRC) message, or the like.

UE 101 attaches to external network element 110 to obtain wireless communication service. UE 101 transfers its UE ID and network ID to external network element 110. In response, external network element 110 signals network controller 120 with the UE ID and the network ID. Without a home policy for UE 101, network controller 120 signals external network element 110 to serve UE 101 as a roaming device. In response to the roaming service, UE 101 displays a roaming icon and typically disables some services. The resulting roaming charges for UE 101 from billing system 150 will probably be higher for roaming than for typical home use.

UE 102 attaches to external network element 110 to obtain wireless communication service. UE 102 transfers its UE ID and the network ID for home services to external network element 110. In response, external network element 110 signals network controller 120 with the UE ID and the network ID. Network controller 120 applies the home policy for UE 102 based on the network ID. Network controller 120 signals external network element 110 to serve UE 102 as a home device. In response to the home service, UE 102 does not display the roaming icon or disable services. The home charges for UE 102 from billing system 150 will probably be lower for the home services than for typical roaming use. The home policy may specify a Quality-of-Service (QoS) for UE 102 and/or the network ID, and external network element 110 delivers the specified QoS to UE 102. This home QoS for UE 102 is probably higher than the typical roaming QoS.

Subsequently, UE 102 re-attaches to external network element 110 and transfers its UE ID and the other network ID for the roaming services to external network element 110. Network controller 120 applies a roaming policy for UE 102 based on the other network ID. In response to roaming, UE 102 displays the roaming icon and may disable services. The roaming charges for UE 102 from billing system 150 will probably be higher than for typical home use.

UE 103 attaches to external network element 110 to obtain wireless communication service. UE 103 transfers its UE ID and network ID to external network element 110. This network ID is associated with multiple communication services and QoS parameters. In response, external network element 110 signals network controller 120 with the UE ID and the network ID. Network controller 120 applies the home policy for UE 103 based on the network ID and signals external network element 110 to serve UE 103 as a home device. In response to the home service, UE 103 does not display a roaming icon or disable services. The home charges for UE 103 from billing system 150 will probably be lower than for typical roaming use. The home policy specifies QoS per service, and external network element 110 delivers the specified QoS to UE 103 based on the specific service being delivered.

External network element 110 transfers usage data for UEs 101-103 including their UE ID and network ID to rating system 140. The usage data comprises service type, data transfer amount per time, and the like. Rating system 140 translates the network ID for UE 101 into a roam rating group. Rating system 140 rates the usage data for UE 101 using the roam rating group and transfers the UE ID and roaming-rated usage data to billing system 150. Rating usage data comprises generating monetary charges for a user bill based on the amount of usage, the rate, and other data in the rate group. Billing system 150 generates roaming charges for the services from external network element 110 using the roaming-rated usage data. Billing system 150 transfers a user bill to the user of UE 101.

Rating system 140 translates the network ID for the home services for UE 102 into its associated home rating group. Rating system 140 rates the usage data for this network ID and services using this home rating group. To rate, rating system 140 generates monetary charges for a user bill based on the amount of usage, the rate, and other data in the rate group. Rating system 140 transfers the UE ID and the home-rated usage data to billing system 150. Subsequently, rating system 140 translates the other network ID for the roaming services for UE 102 into its associated roam rating group. Rating system 140 rates this other usage data for the other network ID and services using this roaming rating group. Rating system 140 transfers the UE ID and the roaming-rated usage data to billing system 150. Billing system 150 generates a user bill based on the rated usage data. Billing system 150 transfers the user bill to the user of UE 102.

Rating system 140 translates the network ID for UE 103 into its associated home rating group. Rating system 140 rates the usage data for UE 103 using the home rating group and transfers the UE ID and the home-rated usage data to billing system 150. Billing system 150 generates a user bill for multiple services from external network element 110 based on the home-rated usage data. Billing system 150 transfers a user bill to the user of UE 103.

The network IDs may comprise an MSC ID, HA ID, eNodeB ID, gNodeB ID, realm, virtual network ID, Public Land Mobile Network (PLMN) ID, Mobile Virtual Network Operator (MVNO) ID, System ID/Network ID (SID/NID), Brand, UE ID, user ID, Uniform Resource Indicator (URI), IP address, IP prefix. Combinations of these IDs may be used and linked through stored translation data structures. For example, a brand ID may be associated with a PLMN ID that is associated with a home rating group when the PLMN ID is served by external network element 110. The network IDs may be associated with individual wireless communication services like prepaid, postpaid, video calling, interactive gaming, and the like. For example, UE 102 may roam on external network element 110 for prepaid services but, UE 102 would be home on external network element 110 for post-paid services.

Figure 2:
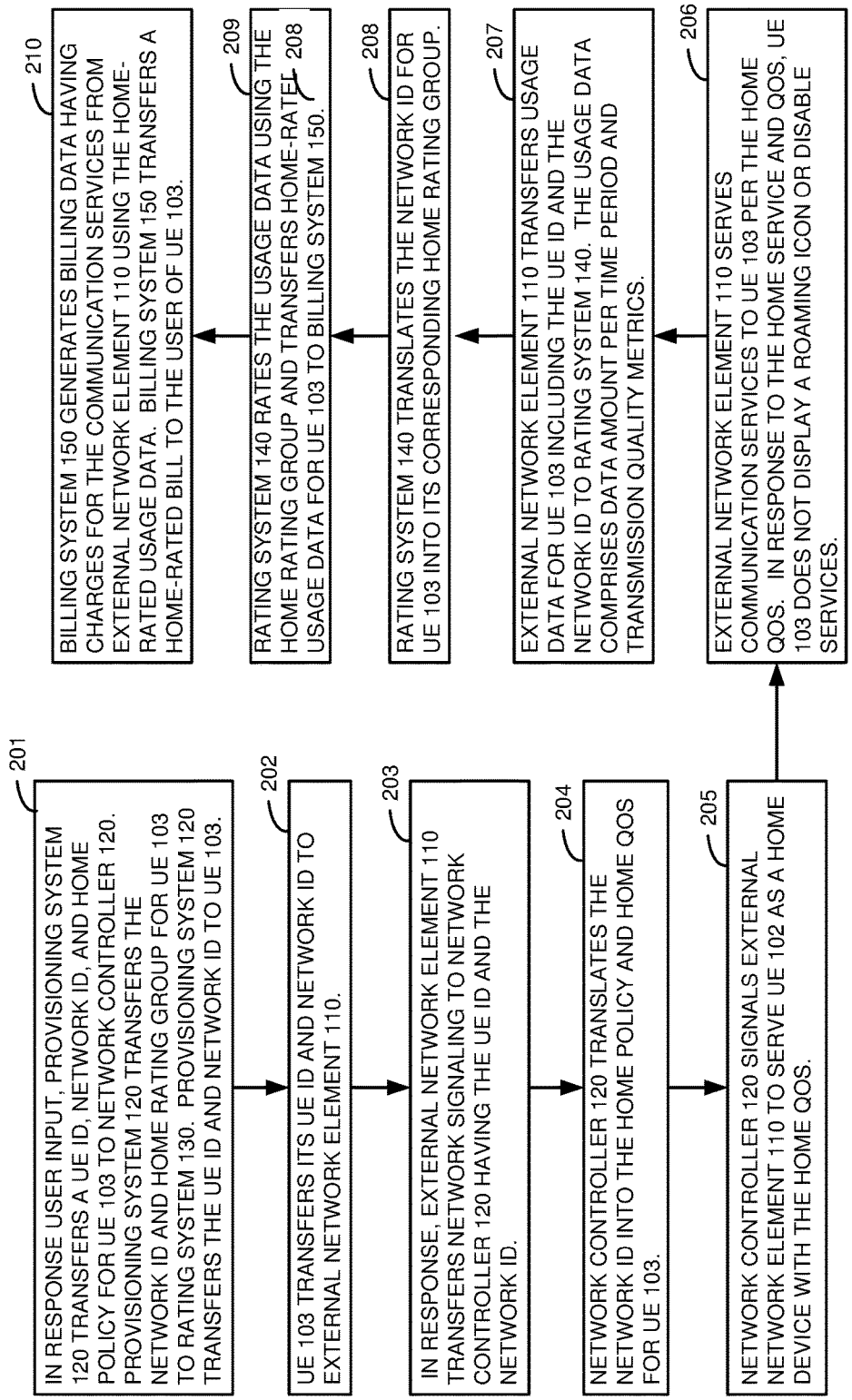
FIG. 2 illustrates the operation of the wireless communication system to serve the wireless UEs from the external wireless communication network element.

FIG. 2 illustrates the operation of wireless communication system 100 to serve wireless UE 103 over external wireless communication network element 110. UE 103 is not home on external wireless network element 110 and previously roamed on external wireless network element 110. To avoid roaming in the future, an operator inputs a UE ID, network ID, and home policy for UE 103 into provisioning system 130. The home policy includes a home rating group and per-service QoS parameters. In response, provisioning system 130 transfers the UE ID, network ID, and home policy for UE 103 to network controller 120 (201). Provisioning system 130 also transfers the network ID and home rating group for UE 103 to rating system 140. Provisioning system 130 transfers the UE ID and network ID to UE 103.

UE 103 transfers the UE ID and network ID to external network element 110 (202). In response, external network element 110 transfers network signaling to network controller 120 that has the UE ID and the network ID (203). Network controller 120 translates the network ID into the home policy and the home QoS for UE 103 (204). Network controller 120 signals external network element 110 to serve UE 103 as a home device with the home QoS (205). External network element 110 serves communication services to UE 103 per the home QoS (206). In response to the home services, UE 103 does not display a roaming icon or disable services.

External network element 110 transfers usage data for UE 103 including the UE ID and the network ID to rating system 140 (207). The usage data comprises data amount per time period and transmission quality metrics. Rating system 140 translates the network ID for UE 103 into its corresponding home rating group (208). Rating system 140 rates the usage data to generate monetary charges using the home rating group and transfers home-rated usage data for UE 103 to billing system 150 (209). Billing system 150 generates billing data having the home charges for the communication services from external network element 110 using the home-rated usage data (210). Billing system 150 transfers a home-rated bill to the user of UE 103.

Figure 3:
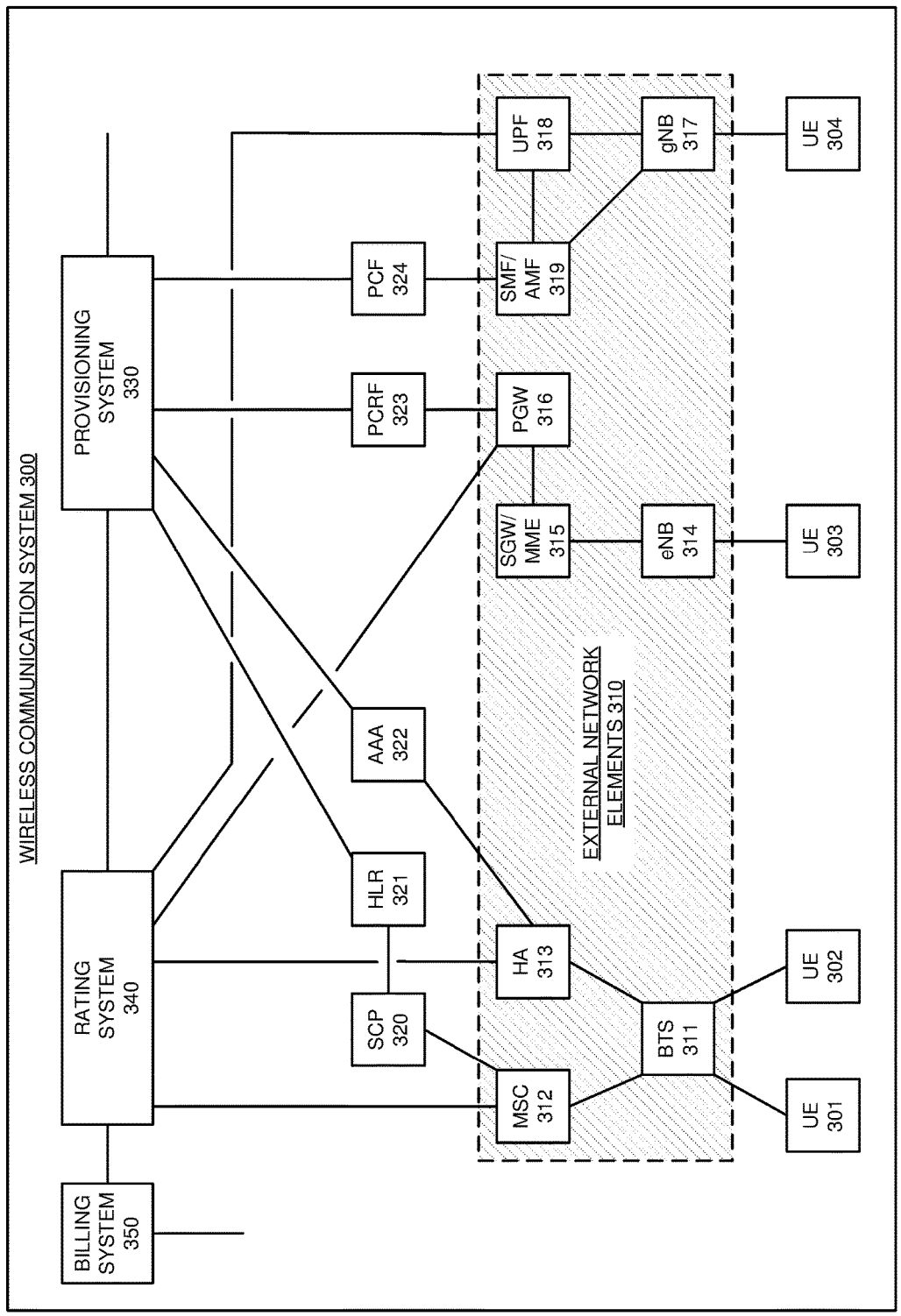
FIG. 3 illustrates a wireless communication system that serves wireless UEs over external wireless communication network elements.

FIG. 3 illustrates wireless communication system 300 that serves wireless UEs 301-304 over external network elements 310. Wireless communication system 300 is an example of communication system 100, although system 100 may differ in various aspects. Wireless communication system 300 comprises UEs 301-304, external network elements 310, Service Control Point SCP 320, Home Location Register (HLR) 321, Authentication Authorization Accounting (AAA) 322, Policy Charging Rules Function (PCRF) 323, Policy Control Function (PCF) 324, provisioning system 330, rating system 340, and billing system 350. Wireless communication system 300 typically includes other network elements like Serving Gateway (SGW), Mobility Management Entity (MME), Session Management Function (SMF), Access and Mobility Management Function (AMF), or some other network element. External network elements comprise Base Transceiver Station (BTS) 311, Mobile Switching Center (MSC) 312, Home Agent (HA) 313, eNodeB (eNB) 314, SGW/MME 315, Packet Data Network Gateway (PGW) 316, gNodeB 317, User Plane Function (UPF) 318, and SMF/AMF 319.

Initially, UEs 301-304 are not home on external network elements 310 and roam when on external network elements 310. To avoid roaming, provisioning system 330 receives UE IDs, network IDs, and home policies for UEs 301-304. The home policies include home rating groups and per-service QoS parameters. In response, provisioning system 330 transfers the UE IDs, network IDs, and home policies for UEs 301-304 to HLR 321, AAA 322, PCRF 323, and PCF 324. HLR 321 loads some UE IDs, network IDs, and home policy data for UEs 301-304 into SCP 320. Provisioning system 330 transfers the network IDs and home rating groups for UEs 301-304 to rating system 340. Provisioning system 130 also transfers the UE IDs and network IDs to UE 301-304 over PRL, OTA, or RRC. The network IDs transferred to HLR 321, SCP 320, and UE 301 comprise an MSC ID for MSC 312. The network IDs transferred to AAA 322 and UE 302 comprise an HA realm. The network IDs transferred to PCRF 323, PCF 324, and UEs 303-304 comprise Public Land Mobile Network IDs.

Upon attachment to BTS 311, UE 301 transfers its UE ID and MSC ID to MSC 312. In response, MSC 312 queries SCP 320 with the UE ID and MSC ID. SCP 320 translates the MSC ID into the home policy data for UE 301. SCP 320 responds to MSC 312 with information from the home policy data. MSC 312 serves communication services to UE 301 per the home policy data. In response to the home service, UE 301 does not display a roaming icon or disable services.

MSC 312 transfers usage data for UE 301 to rating system 340. The usage data comprises total bytes per minute and has the UE ID and MSC ID from UE 301. Rating system 340 translates the MSC ID into the home rating group for UE 301. Rating system 340 applies the home rating group to the usage data to generate home-rated usage data for UE 301. Rating system 340 transfers the home-rated usage data to billing system 350. Billing system 350 generates a user bill for the communication services from external MSC 312 using the home-rated usage data. Billing system 350 transfers a home-rated bill to the user of UE 301. The home-rated bill is typically much cheaper than a comparable roaming-rated bill.

Upon attachment to BTS 311, UE 302 transfers its UE ID and HA realm to HA 313. In response, HA 313 queries AAA 322 with the UE ID and HA realm. AAA 322 translates the HA realm into the home policy for UE 302. AAA 322 responds to HA 313 with information from the home policy like QoS. HA 313 serves UE 302 per the QoS. In response to the home service, UE 302 does not display a roaming icon or disable services.

HA 313 transfers usage data for UE 302 to rating system 340. The usage data comprises total bytes per minute and has the UE ID and HA realm for UE 302. Rating system 340 translates the HA realm into the home rating group for UE 302. Rating system 340 applies the home rating group to the usage data to generate home-rated usage data for UE 302. Rating system 340 transfers the home-rated usage data to billing system 350. Billing system 350 generates a user bill for the communication services from external HA 313 using the home-rated usage data. Billing system 350 transfers a home-rated bill to the user of UE 302. The home-rated bill is typically much cheaper than a comparable roaming-rated bill.

Upon attachment to eNB 314, UE 303 transfers its UE ID and PLMN ID to PGW 316 (through SGW/MME 315). In response, PGW 316 queries PCRF 323 with the UE ID and PLMN ID. PCRF 323 translates the PLMN ID into the home policy for UE 303. PCRF 323 responds to PGW 316 with information from the home policy like QoS. PGW 316 serves UE 303 per the QoS (as do SGW/MME 315 and eNB 314). In response to the home service, UE 303 does not display a roaming icon or disable services.

PGW 316 transfers usage data for UE 303 to rating system 340. The usage data comprises total bytes per second and has the UE ID and PLMN ID for UE 303. Rating system 340 translates the PLMN ID into the home rating group for UE 304. Rating system 340 applies the home rating group to the usage data to generate home-rated usage data for UE 303. Rating system 340 transfers the home-rated usage data to billing system 350. Billing system 350 generates a user bill for the communication services from external PGW 316 using the home-rated usage data. Billing system 350 transfers a home-rated bill to the user of UE 303. The home-rated bill is typically much cheaper than a comparable roaming-rated bill.

Upon attachment to gNB 317, UE 304 transfers its UE ID and PLMN ID to SMF/AMF 319. In response, SMF/AMF 319 query PCF 324 with the UE ID and PLMN ID for UE 304. PCF 324 translates the PLMN ID into the home policy for UE 304. PCF 324 responds to SMF/AMF 319 with information from the home policy like QoS. UPF 318 serves UE 304 per the QoS (as do SMF/AMF 319 and gNB 317). In response to the home service, UE 304 does not display a roaming icon or disable services.

UPF 318 transfers usage data for UE 304 to rating system 340. The usage data comprises total bytes per second and has the UE ID and PLMN ID for UE 304. Rating system 340 translates the PLMN ID into the home rating group for UE 304. Rating system 340 applies the home rating group to the usage data to generate home-rated usage data for UE 304. Rating system 340 transfers the home-rated usage data to billing system 350. Billing system 350 generates a user bill for the communication services from external UPF 318 using the home-rated usage data. Billing system 350 transfers the home-rated bill to the user of UE 304. The home-rated bill is typically much cheaper than a comparable roaming-rated bill.

Figure 4:
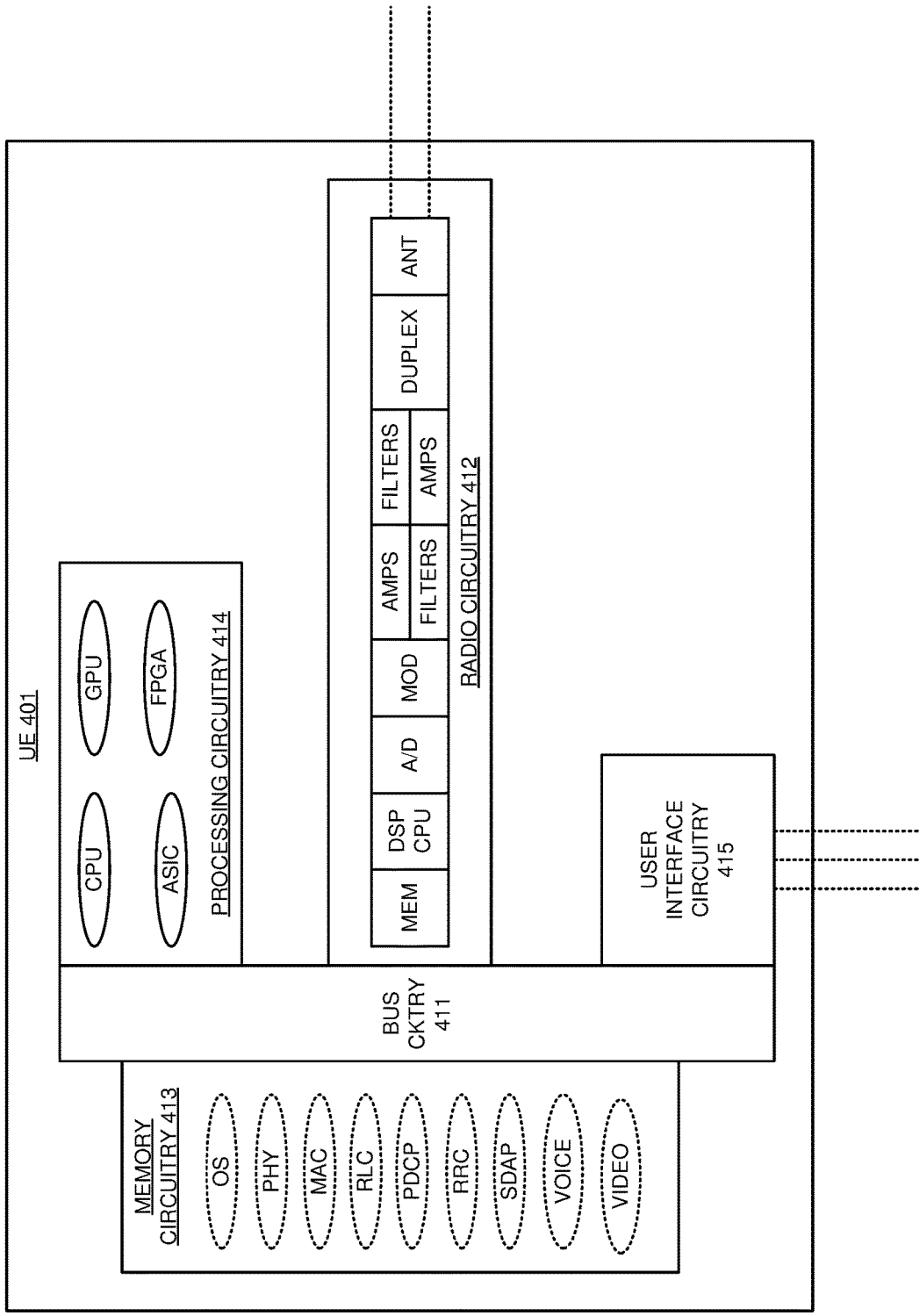
FIG. 4 illustrates a wireless UE that receives wireless communication service over external wireless communication network elements.

FIG. 4 illustrates wireless UE 401 that receives wireless communication service over external wireless communication network elements. UE 400 is an example of UEs 101-103 and 301-304, although UEs 101-103 and 301-304 may differ. UE 400 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415. Memory circuitry 413 comprises volatile and non-volatile memories like flash, disc, tape, and the like. Memory circuitry 413 stores operating systems, network applications, and user applications for voice and video. Processing circuitry 414 comprises Central Processing Units (CPUs), Graphical Processing Units (GPUs), Application Specific Integrated Circuits (ASICs), Field Programmable Gate Arrays (FPGAs), and/or some other computer hardware. Processing circuitry 414 executes the operating systems, network applications, and user applications to drive radio circuitry 412 and user interface circuitry 415. User interface circuitry 415 comprises displays, cameras, speakers, microphones, transceivers, ports, and/or some other user components.

Radio circuitry 412 comprises antennas (ANT), duplexers (DUPLEX), filters, amplifiers (AMPS), modulators (MOD), analog/digital interfaces (A/D), Digital Signal Processors (DSP), CPU, and memory (MEM). The antennas in radio circuitry 412 exchange wireless data and signaling with external network elements. The DSP/CPUs execute firmware/software to drive the exchange of the data and signaling between the antennas and the radio memory. Processing circuitry 414 executes the operating systems and network applications to drive the exchange of data and signaling between the radio memory and memory circuitry 413.

The voice and video applications generate voice/video data and signaling—typically by user interface circuitry 415 sensing voice/video data. The network applications process the application data and signaling to generate and store UL data and signaling in the radio memory. In radio circuitry 412, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to the external network elements.

In radio circuitry 412, the antennas receive wireless Downlink (DL) signals from the external network elements and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs transfer the DL data and signaling to memory circuitry 413. The network applications process the DL data and signaling in memory circuitry 413 to generate voice/video data and application signaling. The voice and video applications process the voice/video data and application signaling—typically by user interface circuitry 415 presenting the voice/video data.

The network applications comprise Physical Layer (PHY), Media Access Control (MAC), Radio Link Control (RLC), Packet Data Convergence Protocol (PDCP), Radio Resource Control (RRC), Service Data Application Protocol (SDAP), and the like. The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and QoS. The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC receives UE IDs and network IDs from a home provisioning system—typically through PRL and OTA configuration. The UE IDs comprise UE information like International Mobile Subscriber Indicator (IMSI), International Mobile Equipment Indicator (IMEI), and Internet Protocol prefix. The RRC interacts with network elements like MSCs, HAs, AMFs, and MMEs to establish and terminate data sessions. The RRC transfers the UE IDs and network IDs to the external network elements as described herein. The RRC receives and processes a random number and the secret key to generate and return an authentication result for LTE network authentication. The RRC supports N1 and Non-Access Stratum (NAS) messaging with the MMEs/AMFs. The RRC handles security and key management, handover operations, status reporting, QoS, system broadcasts, and network pages. The SDAP exchanges S3 data with User Plane Functions (UPFs) under the control of Session Management Functions (SMFs). The SDAP maps between the SDUs and the QoS flows and mark the QoS flows with the proper QoS.

Figure 5:
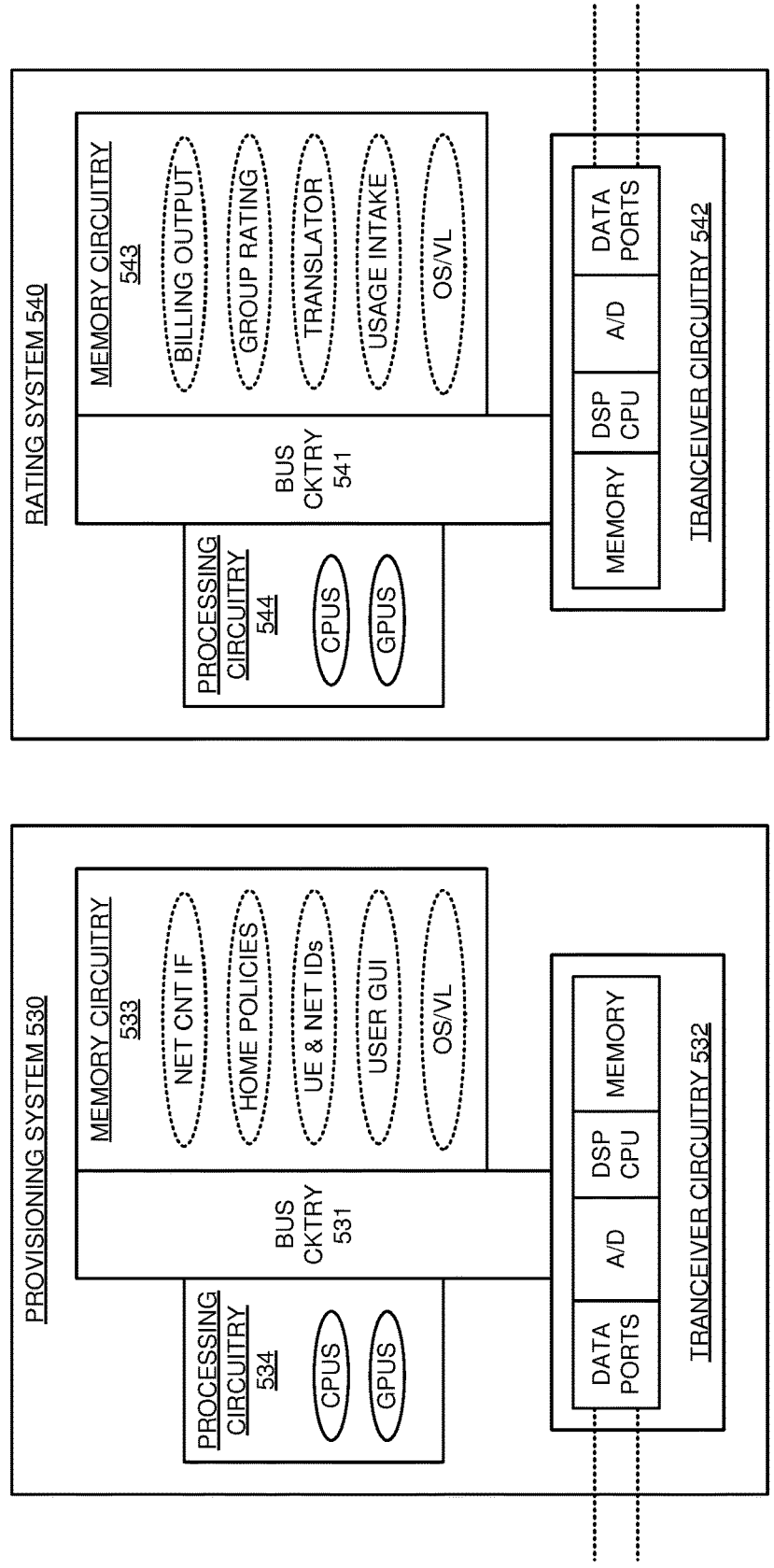
FIG. 5 illustrates a provisioning system and a rating system that serves wireless UEs over external wireless communication network elements.

FIG. 5 illustrates provisioning system 530 and rating system 540 that serve wireless UEs over external network elements. Provisioning system 530 and rating system 540 are examples of provisioning systems 130/330 and rating systems 140/340, although systems 130/330 and 140/340 may differ. Provisioning system 530 comprises bus circuitry 531, transceiver circuitry 532, memory circuitry 533, and processing circuitry 534. Bus circuitry 531 couples transceiver circuitry 532, memory circuitry 533, and processing circuitry 534. Memory circuitry 533 comprises volatile and non-volatile memories like flash, disc, tape, and the like. Memory circuitry 533 stores operating systems (OS), virtual layers (VL), and network applications like user Graphical User Interface (GUI), UE and network IDs, home polices, and network control interface (NET CNT IF). Processing circuitry 534 comprises CPUs, GPUs, and/or some other computer hardware that executes the operating system and network applications. Transceiver circuitry 532 comprises memory, DSP, CPU, analog-to-digital interface, and data ports. The data ports in transceiver circuitry 532 communicate with rating systems, network controllers, and user interfaces.

Processing circuitry 534 executes the operating systems to drive the hardware and support the virtual layers. Processing circuitry 534 executes the virtual layers to support the network applications. The virtual layers comprise virtual switches, virtual machines, hypervisors, and the like. In transceiver circuitry 532, the DSP/CPUs exchange data and signaling with the transceiver memory. Processing circuitry 534 exchanges the data and signaling between the transceiver memory and memory circuitry 533. Processing circuitry 534 executes the network applications to process the data and signaling in memory circuitry 534.

In particular, the user GUI receives user inputs that specify associations of UE IDs, network IDs, and home policies that include home rate groups. A data structure associates UE IDs, network IDs, and home policies in memory circuitry 533 based on the user inputs. The network control interface transfers associated UE IDs, network IDs, and home policies to network controllers that support external network elements. The network control interface transfers associated UE IDs, network IDs, and home rate groups to a rating system. The network control interface transfers associated UE IDs and network IDs for delivery to the UEs.

Rating system 540 comprises bus circuitry 541, transceiver circuitry 542, memory circuitry 543, and processing circuitry 544. Bus circuitry 541 couples transceiver circuitry 542, memory circuitry 543, and processing circuitry 544. Memory circuitry 543 comprises volatile and non-volatile memories like flash, disc, tape, and the like. Memory circuitry 543 stores operating systems, virtual layers, and network applications like usage intake, network ID translator, group rating, and billing output. Processing circuitry 544 comprises CPUs, GPUs, and/or some other computer hardware that executes the operating system and network applications. Transceiver circuitry 542 comprises memory, DSP, CPU, analog-to-digital interface, and data ports. The data ports in transceiver circuitry 542 communicate with provisioning systems, billing systems, external network elements, and user interfaces.

Processing circuitry 544 executes the operating systems to drive the hardware and support the virtual layers. Processing circuitry 544 executes the virtual layers to support the network applications. The virtual layers comprise virtual switches, virtual machines, hypervisors, and the like. In transceiver circuitry 542, the DSP/CPUs exchange data and signaling with the transceiver memory. Processing circuitry 544 exchanges the data and signaling between the transceiver memory and memory circuitry 543. Processing circuitry 544 executes the network applications to process the data and signaling in memory circuitry 544.

In particular, the usage intake receives usage data generated by external network elements that indicates corresponding UE IDs and network IDs. The network translator translates network IDs into home rating groups. Group rating rates the usage data with their associated home rating groups to generate monetary charges for the usage in home-rated usage data. The billing output transfers the home-rated usage data to a billing system.

Figure 6:
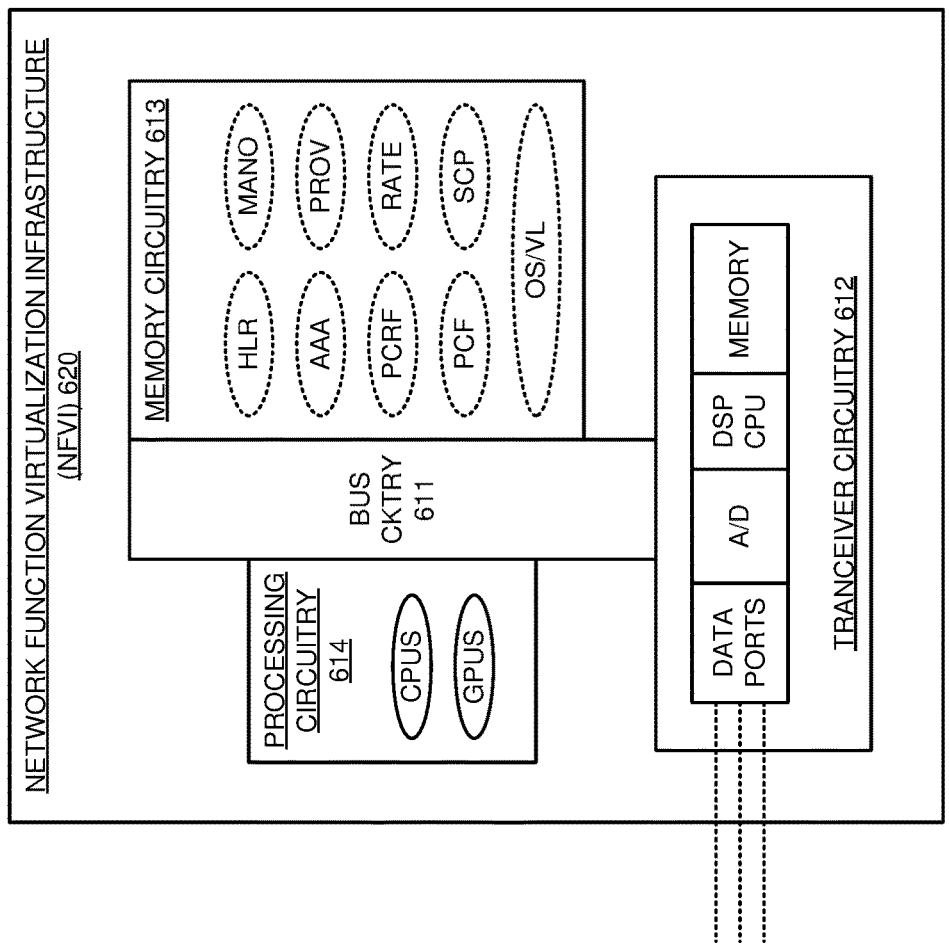
FIG. 6 illustrates a Network Function Virtualization Infrastructure (NFVI) that serves wireless UEs over external wireless communication network elements.

FIG. 6 illustrates Network Function Virtualization Infrastructure (NFVI) 620 that serves wireless UEs over external network elements. NFVI 620 is an example of network controller 120 and communication system 300, although controller 120 and system 300 may differ. NFVI 600 comprises bus circuitry 611, transceiver circuitry 612, memory circuitry 613, and processing circuitry 614. Bus circuitry 611 couples transceiver circuitry 612, memory circuitry 613, and processing circuitry 614. Memory circuitry 613 comprises volatile and non-volatile memories like flash, disc, tape, and the like. Memory circuitry 613 stores operating systems, virtual layers, and Virtual Network Functions (VNFs) like PCRF, PCRF, AAA, HLR, SCP, rating, provisioning (PROV), and Management and Orchestration (MANO).

Processing circuitry 614 comprises CPUs, GPUs, and/or some other computer hardware that executes the operating system and network applications. Transceiver circuitry 612 comprises memory, DSP, CPU, analog-to-digital interface, and data ports. The data ports in transceiver circuitry 612 communicate with rating systems, network controllers, and user interfaces. Processing circuitry 614 executes the operating systems to drive the hardware and support the virtual layers. Processing circuitry 614 executes the virtual layers to support the VNFs. The virtual layers comprise virtual switches, virtual machines, hypervisors, and the like. Processing circuitry 614 executes the MANO to load and control the VNFs. In transceiver circuitry 612, the DSP/CPUs exchange data and signaling with the transceiver memory. Processing circuitry 614 exchanges the data and signaling between the transceiver memory and memory circuitry 613. Processing circuitry 614 executes the VNFs to process the data and signaling in memory circuitry 614.

In particular, the provisioning VNF receives user inputs that specify associations of UE IDs, network IDs, and home policies that indicate home rate groups. The provisioning VNF maintains a data structure that associates UE IDs, network IDs, and home policies in memory circuitry 613 based on the user inputs. The provisioning VNF transfers associated UE IDs, network IDs, and home policies to network controllers that support external network elements. The provisioning VNF transfers the associated UE IDs, network IDs, and home rate groups to the rating VNF. The provisioning VNF transfers the associated UE IDs and network IDs for delivery to the UEs.

The PCF VNF receives UE IMSIs, PLMN IDs, and home policies from the provisioning VNF. The PCF VNF receives the UE IMSIs and the PLMN IDs from external network elements like 5GC SMFs responsive to roaming UE attachments. The PCF VNF translates the PLMN IDs into the home policies for the UE IMSIs. The PCF VNF transfers the home policies to the external network elements (SMF/UPF VNFs) which serve the roaming UEs with home services and home QoS.

The PCRF VNF receives UE IMSIs, PLMN IDs, and home policies from the provisioning VNF. The PCRF VNF receives the UE IMSIs and the PLMN IDs from external network elements like LTE PGW VNFs responsive to roaming UE attachments. The PCRF VNF translates the PLMN IDs into the home policies for the UE IMSIs. The PCRF VNF transfers the home policies to the external network elements (PGW) which serve the roaming UEs with home services and home QoS.

The AAA VNF receives UE Mobile Identification Numbers (MINs), HA realms, and home policies from the provisioning VNF. The AAA VNF receives the UE MINs and the HA realms from external network elements like HAs responsive to roaming UE attachments. The AAA VNF translates the HA realms into the home policies for the UE MINs. The AAA VNF transfers the home policies to the external network elements (HAs) which serve the roaming UEs with home services and home QoS.

The HLR VNF receives UE MINs, MSC IDs, and home policies from the provisioning VNF. The HLR VNF loads the UE MINs, MSC IDs, and home policies in the SCP VNF. The SCP VNF receives the UE MINs and the MSC IDs external network elements like MSCs responsive to roaming UE attachments. The SCP VNF translates the MSC IDs into the home policies for the UE MINs. The SCP VNF transfers the home policies to the external network elements (MSCs) which serve the roaming UEs with home services and home QoS.

The rating VNF receives usage data generated by external network elements that indicates corresponding UE IDs and network IDs. The rating VNF translates the network IDs into home rating groups. The rating VNF rates the usage data with their associated home rating groups to generate home-rated usage data. The rating VNF transfers the home-rated usage data to a billing system.

Figure 7:
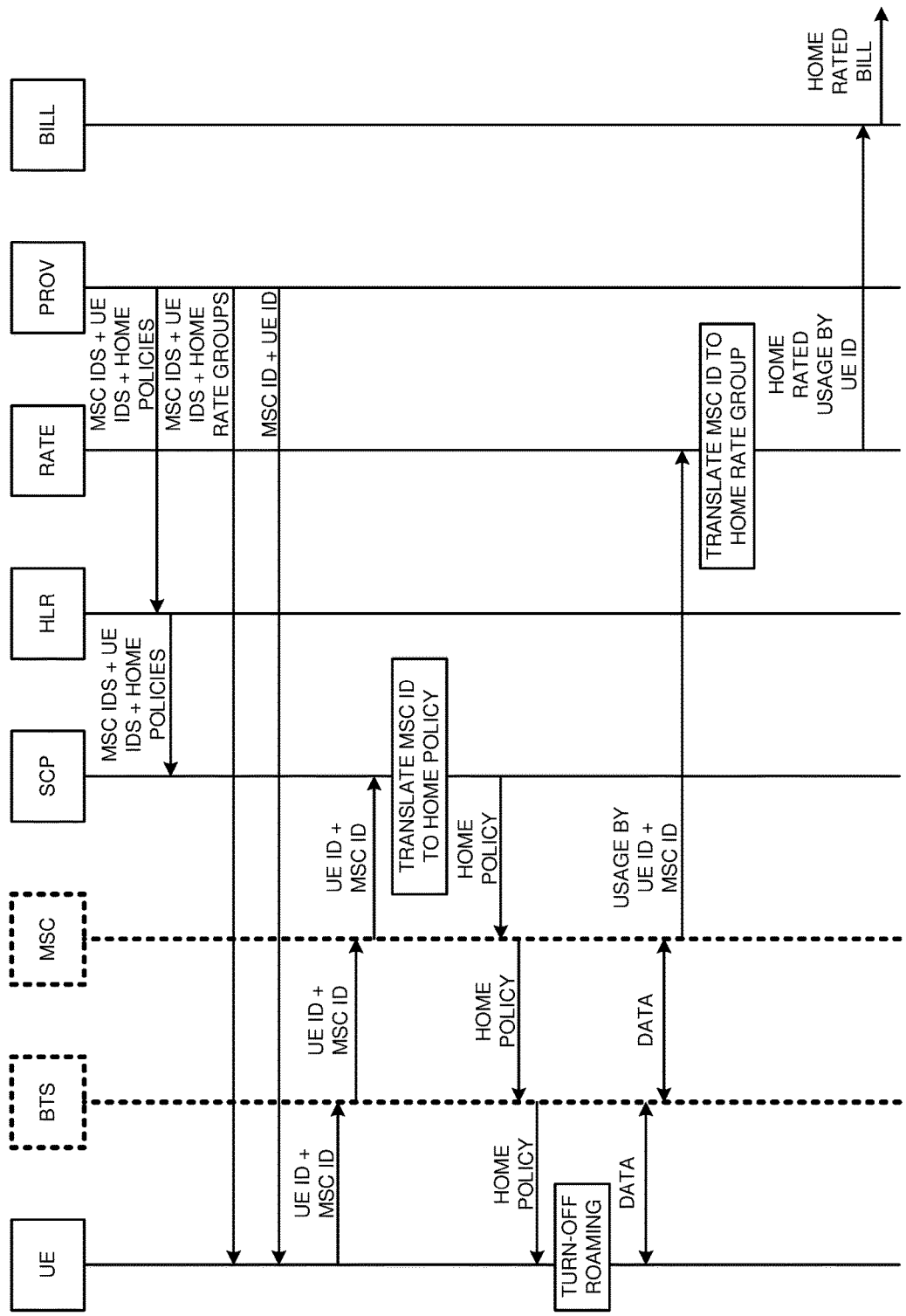
FIG. 7 illustrates the operation of a wireless communication system to serve a wireless UE from an external Mobile Switching Center (MSC).

FIG. 7 illustrates the operation of a wireless communication system to serve a wireless UE from an external Mobile Switching Center (MSC). The operation is exemplary and the operation of communication systems 100 and 300 may differ. The provisioning system (PROV) receives associations of UE IDs, MSC IDs, and home policies that indicate home rate groups. The provisioning system transfers associated UE IDs, MSC IDs, and home policies to an HLR that supports an external MSC. The HLR loads the UE IDs, MSC IDs, and home policy data into an SCP that supports the external MSC. The provisioning system transfers the associated UE IDs, MSC IDs, and home rate groups to the rating system. The provisioning system transfers the associated UE ID and MSC ID for delivery to the UE. The UE attaches to the external BTS and transfers its UE ID and MSC ID. The external BTS transfers the UE ID and MSC ID to the external MSC. The external MSC transfers the UE ID and MSC ID to the SCP. The SCP translates the MSC ID into the home policy data for the UE ID. The SCP transfers the home policy data to the external MSC. The external MSC transfers the home policy data to the UE over the BTS. In response to the home policy data, the UE turns off roaming. The UE exchanges user data with the external MSC over the external BTS. The external MSC transfers usage data to the rating system that indicates UE ID, MSC ID, and transferred bytes per time period. The rating system translates the MSC ID into the home rating group. The rating system rates the usage data with the home rating group to generate home-rated usage data. The rating system transfers the home-rated usage data to the billing system. The billing system generates and transfers home-rated bills for the UE based on the home-rated usage data.

Figure 8:
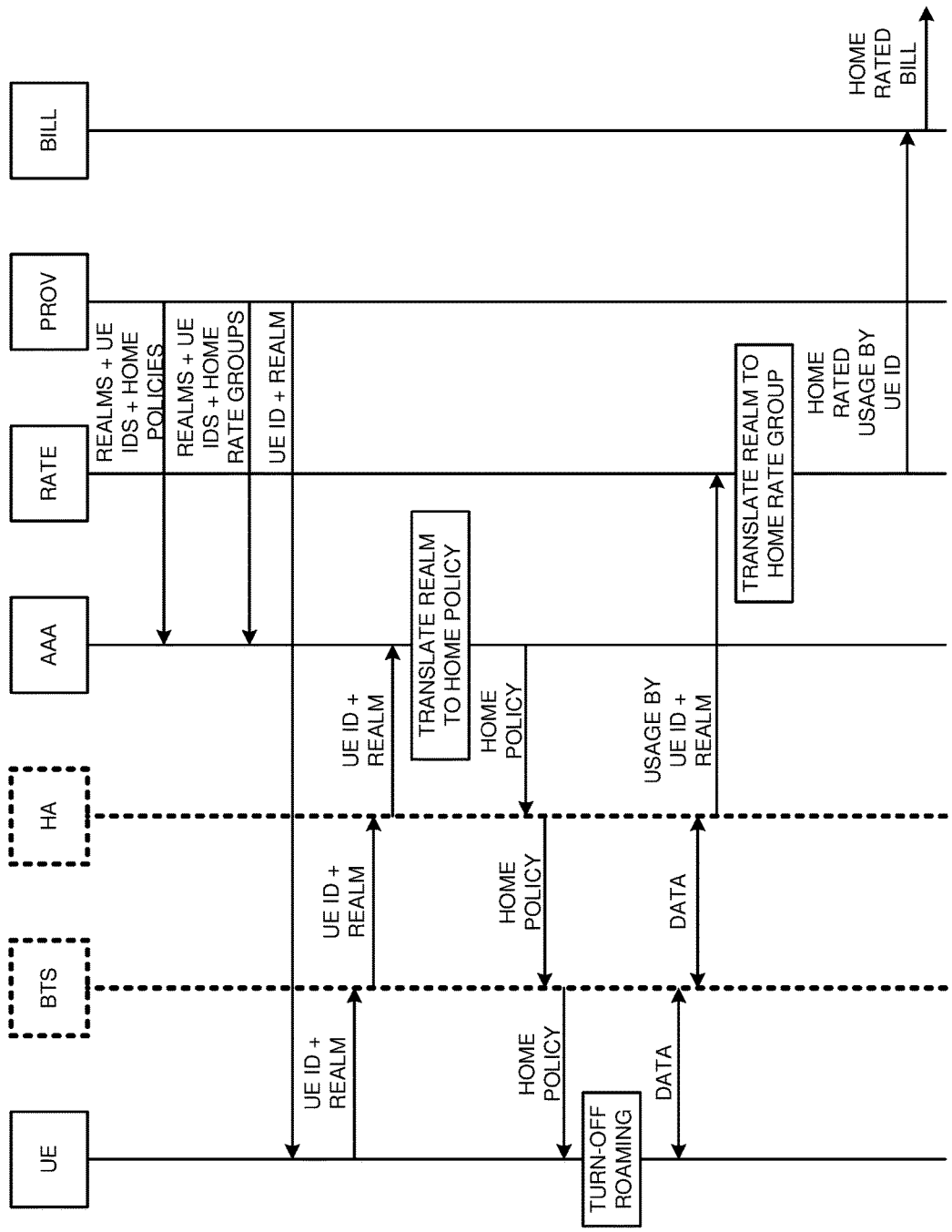
FIG. 8 illustrates the operation of a wireless communication system to serve a wireless UE from an external Home Agent (HA).

FIG. 8 illustrates the operation of a wireless communication system to serve a wireless UE from an external Home Agent (HA). The operation is exemplary and the operation of communication systems 100 and 300 may differ. The provisioning system receives associations of UE IDs, realms, and home policies that indicate home rate groups. The provisioning system transfers associated UE IDs, realms, and home policies to a AAA that supports an external HA. The provisioning system transfers the associated UE IDs, realms, and home rate groups to the rating system. The provisioning system transfers the associated UE ID and realms for delivery to the UE. The UE attaches to the external HA over the external BTS and transfers its UE ID and realm. The external HA transfers the UE ID and realm to the AAA. The AAA translates the realm into home policy data for the UE ID. The AAA transfers the home policy data to the external HA. The external HA transfers the home policy data to the UE over the external BTS. In response to the home policy data, the UE turns off roaming. The UE exchanges user data with the external HA over the external BTS. The external HA transfers usage data to the rating system that indicates UE ID, realm, and transferred bytes per time period. The rating system translates the realm into the home rating group. The rating system rates the usage data with the home rating group to generate home-rated usage data. The rating system transfers the home-rated usage data to the billing system. The billing system generates and transfers home-rated bills for the UE based on the home-rated usage data.

Figure 9:
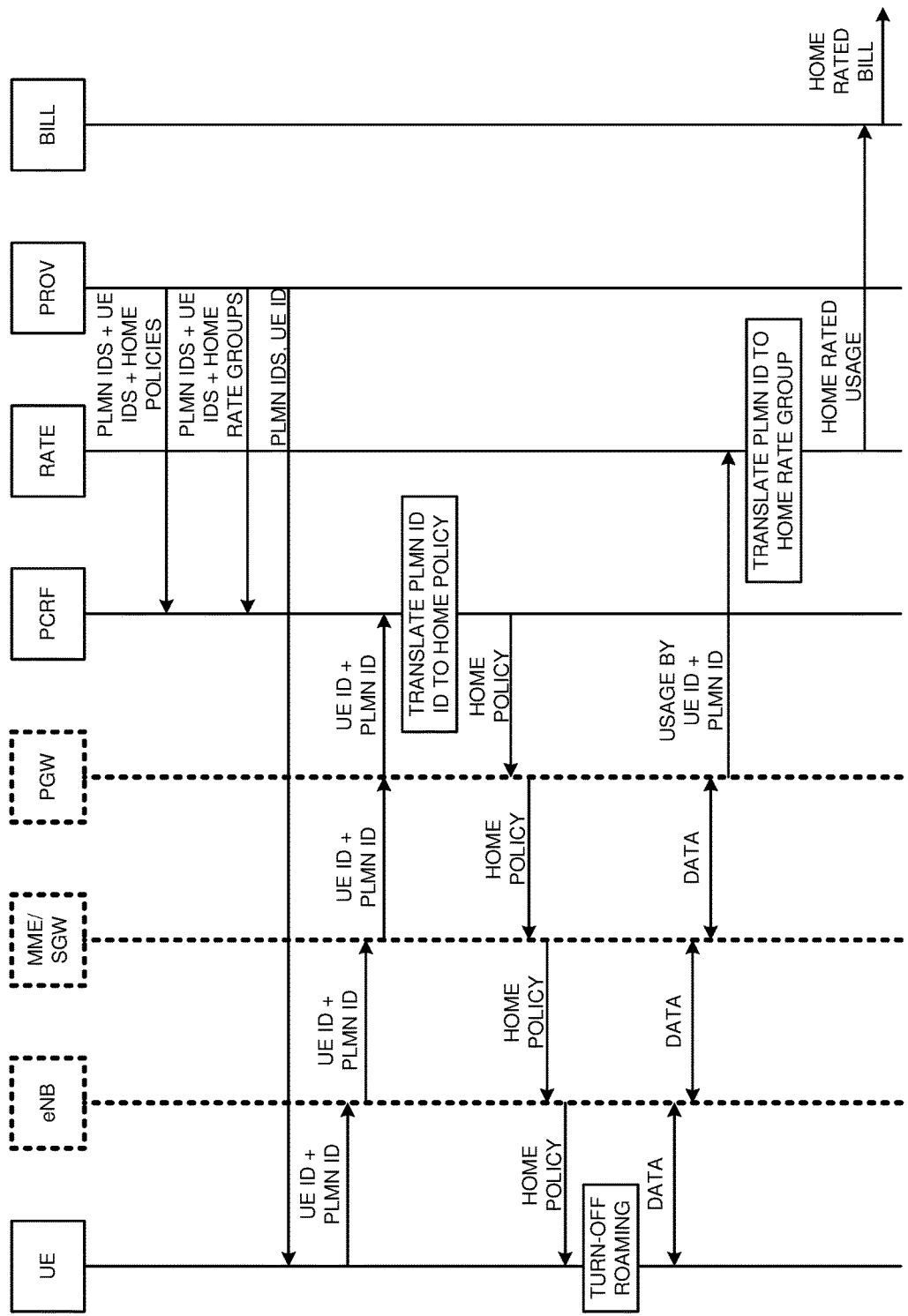
FIG. 9 illustrates the operation of a wireless communication system to serve a wireless UE from an external Packet Data Network Gateway (PGW).

FIG. 9 illustrates the operation of a wireless communication system to serve a wireless UE from an external Packet Data Network Gateway (PGW). The operation is exemplary and the operation of communication systems 100 and 300 may differ. The provisioning system receives associations of UE IDs, PLMN IDs, and home policies that indicate home rate groups. The provisioning system transfers associated UE IDs, PLMN IDs, and home policies to a PCRF that supports an external PGW. The provisioning system transfers the associated UE IDs, PLMN IDs, and home rate groups to the rating system. The provisioning system transfers the associated UE ID and PLMN IDs for delivery to the UE. The UE attaches to the external PGW over the external eNB, external SGW, and external MME. The UE transfers its UE ID and PLMN ID to the external PGW. The external PGW transfers the UE ID and PLMN ID to the PCRF. The PCRF translates the PLMN ID into home policy data for the UE ID. The PCRF transfers the home policy data to the external PGW. The external PGW transfers the home policy data to the UE over the external eNB, external SGW, and external MME. In response to the home policy data, the UE turns off roaming. The UE exchanges user data with the external PGW. The external PGW transfers usage data to the rating system that indicates UE ID, PLMN ID, and transferred bytes per time period. The rating system translates the PLMN ID into the home rating group. The rating system rates the usage data with the home rating group to generate home-rated usage data. The rating system transfers the home-rated usage data to the billing system. The billing system generates and transfers home-rated bills for the UE based on the home-rated usage data.

Figure 10:
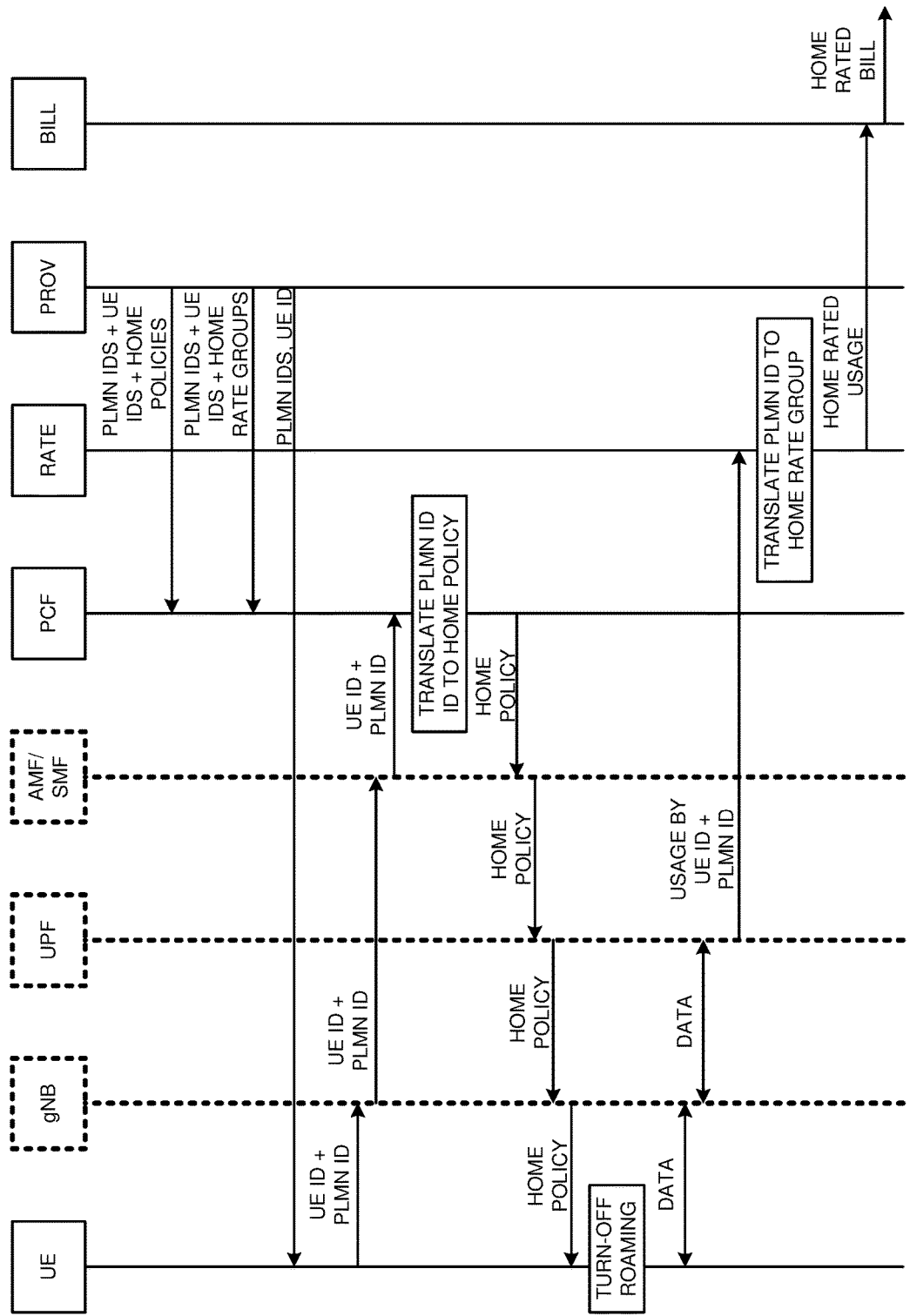
FIG. 10 illustrates the operation of a wireless communication system to serve a wireless UE from an external User Plane Function (UPF).

FIG. 10 illustrates the operation of a wireless communication system to serve a wireless UE from an external 5GC User Plane Function (UPF). The operation is exemplary and the operation of communication systems 100 and 300 may differ. The provisioning system receives associations of UE IDs, PLMN IDs, and home policies that indicate home rate groups. The provisioning system transfers associated UE IDs, PLMN IDs, and home policies to a PCF that supports an external UPF. The provisioning system transfers the associated UE IDs, PLMN IDs, and home rate groups to the rating system. The provisioning system transfers the associated UE ID and PLMN IDs for delivery to the UE. The UE attaches to the external UPF over the external gNB, external AMF, and external SMF. The UE transfers its UE ID and PLMN ID to the external SMF. The external SMF transfers the UE ID and PLMN ID to the PCF. The PCF translates the PLMN ID into home policy data for the UE ID. The PCF transfers the home policy data to the external SMF. The external SMF transfers the home policy data to the UE over the external gNB and external AMF. The external SMF transfers the home policy data for the UE ID to the UPF. In response to the home policy data, the UE turns off roaming. The UE exchanges user data with the external UPF. The external UPF transfers usage data to the rating system that indicates UE ID, PLMN ID, and transferred bytes per time period. The rating system translates the PLMN ID into the home rating group. The rating system rates the usage data with the home rating group to generate home-rated usage data. The rating system transfers the home-rated usage data to the billing system. The billing system generates and transfers home-rated bills for the UE based on the home-rated usage data.

The wireless data network circuitry described above comprises computer hardware and software that form special-purpose network elements that serve users with home-rated wireless communication services using external wireless networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network elements that serve users with home-rated wireless communication services using external wireless networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to serve wireless User Equipment (UE) over external wireless communication networks, the method comprising:
a provisioning computer system transferring a UE Identity (ID), network ID, and home policy for the UE to a network controller and transferring the network ID and a home rating group to a rating computer system;
the network controller receiving the UE ID and Network ID from an external network element and responsively transferring the home policy for the UE to the external network element, wherein the external network element serves the UE based on the home policy and transfers external usage data for the UE ID and the Network ID; and
the rating computer system receiving the external usage data for the UE ID and the Network ID from the external network element, translating the network ID into the home rating group, rating the external usage data using the home rating group, and transferring the UE ID and home-rated usage data to a billing system, wherein the billing system charges for the external network element service using the home-rated usage data.

2. The method of claim 1 wherein the network controller comprises a Policy Charging Rules Function (PCRF) and the external network element comprises a Packet Data Network Gateway (P-GW).

3. The method of claim 1 wherein the network controller comprises an Authentication Authorization Accounting (AAA) server and the external network element comprises a Home Agent (HA).

4. The method of claim 1 wherein the network controller comprises a Service Control Point (SCP) and the external network element comprises a Mobile Switching Center (MSC).

5. The method of claim 1 wherein the network controller comprises a Home Location Register (HLR) and the external network element comprises a Mobile Switching Center (MSC).

6. The method of claim 1 wherein the network controller comprises a Fifth Generation Core (5GC) Policy Control Function and the external network element comprises a 5GC User Plane Function (UPF).

7. The method of claim 1 wherein the Network ID comprises a Public Land Mobile Network (PLMN) ID.

8. The method of claim 1 wherein the Network ID comprises one of a Home Agent (HA) realm and Mobile Switching Center (MSC) ID.

9. The method of claim 1 wherein the external network element indicates at least some of the home policy to the UE and the wireless UE uses a home mode and not a roaming mode responsive to the home policy.

10. The method of claim 1 wherein the external network element indicates at least some of the home policy to the UE and the wireless UE does not graphically present a roaming indicator responsive to the home policy.

11. The method of claim 1 wherein the network controller comprises a Policy Charging Rules Function (PCRF) and the external network element comprises a Packet Data Network Gateway (P-GW).

12. The method of claim 1 wherein the network controller comprises an Authentication Authorization Accounting (AAA) server and the external network element comprises a Home Agent (HA).

13. The method of claim 1 wherein the network controller comprises a Service Control Point (SCP) and the external network element comprises a Mobile Switching Center (MSC).

14. The method of claim 1 wherein the network controller comprises a Home Location Register (HLR) and the external network element comprises a Mobile Switching Center (MSC).

15. The method of claim 1 wherein the network controller comprises a Fifth Generation Core (5GC) Policy Control Function and the external network element comprises a 5GC User Plane Function (UPF).

16. The method of claim 1 wherein the Network ID comprises a Public Land Mobile Network (PLMN) ID.

17. The method of claim 1 wherein the Network ID comprises one of a Home Agent (HA) realm and Mobile Switching Center (MSC) ID.

18. The method of claim 1 wherein the external network element indicates home policy information from the home policy to the UE and the wireless UE uses a home mode and not a roaming mode responsive to the home policy information.

19. The method of claim 1 wherein the external network element indicates home policy information from the home policy to the UE and the wireless UE does not graphically present a roaming indicator responsive to the home policy information.

20. A wireless communication system to serve wireless User Equipment (UE) over external wireless communication networks, the wireless communication system comprising:
a provisioning computer system configured to transfer a UE Identity (ID), network ID, and home policy for the UE to a network controller and transfer the network ID and a home rating group to a rating computer system;
the network controller configured to receive the UE ID and Network ID from an external network element and responsively transfer the home policy for the UE to the external network element, wherein the external network element serves the UE based on the home policy and transfers external usage data for the UE ID and the Network ID; and
the rating computer system configured to receive the external usage data for the UE ID and the Network ID from the external network element, translate the network ID into the home rating group, rate the external usage data using the home rating group, and transfer the UE ID and home-rated usage data to a billing system, wherein the billing system charges for the external network element service using the home-rated usage data.

* * * * *